US008430256B2

(12) United States Patent
Allore et al.

(10) Patent No.: US 8,430,256 B2
(45) Date of Patent: Apr. 30, 2013

(54) EXTRUDED HOUSING FOR HAND-HELD DEVICE WITH A CAP FOR COVERING TWO OR MORE ADJACENT SIDES

(75) Inventors: Joseph L. Allore, Mundelein, IL (US); Gary R. Weiss, Buffalo Grove, IL (US); Jason P. Wojack, Libertyville, IL (US)

(73) Assignee: Motorola Mobility LLC, Libertyville, IL (US)

(*) Notice: Subject to any disclaimer, the term of this patent is extended or adjusted under 35 U.S.C. 154(b) by 733 days.

(21) Appl. No.: 12/269,555

(22) Filed: Nov. 12, 2008

(65) Prior Publication Data
US 2010/0053853 A1    Mar. 4, 2010

Related U.S. Application Data

(60) Provisional application No. 61/094,052, filed on Sep. 3, 2008.

(51) Int. Cl.
*B65D 6/28* (2006.01)
*B65D 6/00* (2006.01)
*H05K 5/00* (2006.01)

(52) U.S. Cl.
USPC .............. 220/4.02; 220/4.01; 361/679.01; 455/575.1

(58) Field of Classification Search .......... 220/4.01, 220/4.02, 675; 361/679.01, 724, 727; 455/575.1
See application file for complete search history.

(56) References Cited

U.S. PATENT DOCUMENTS

| 4,111,328 | A | 9/1978 | Eggert et al. |
| 4,391,883 | A | 7/1983 | Williamson et al. |
| 4,700,274 | A | 10/1987 | Laut |
| 5,270,702 | A | 12/1993 | Krolak |
| 5,508,124 | A | 4/1996 | Gordecki et al. |
| D374,441 | S | 10/1996 | Castilla et al. |
| 5,692,333 | A | 12/1997 | McClave |
| 6,155,093 | A | 12/2000 | Lipari |
| 6,305,908 | B1 * | 10/2001 | Hermann et al. ............. 417/234 |
| 6,531,985 | B1 | 3/2003 | Jones et al. |
| 6,806,835 | B2 | 10/2004 | Iwai et al. |
| 6,861,989 | B2 | 3/2005 | Morningstar et al. |
| 6,876,543 | B2 | 4/2005 | Mockridge et al. |
| 6,904,300 | B1 | 6/2005 | Määttänen et al. |

(Continued)

FOREIGN PATENT DOCUMENTS

| IE | 922617 A1 | 10/1993 |
| JP | 08288058 A | 11/1996 |

(Continued)

OTHER PUBLICATIONS

Nokia 6500 Classic.

(Continued)

*Primary Examiner* — Anthony Stashick
*Assistant Examiner* — Madison L Poos

(57) ABSTRACT

A housing for a hand-held electronic device is provided. The housing includes an extruded element having a length and a profile, the length corresponding to a distance that the extruded element extends in the direction of extrusion, and the profile corresponding to a cross-section of the element, which is perpendicular to the direction of extrusion. The housing further includes a cap, coupled to the extruded element, wherein the cap extends to cover substantial portions of two or more adjacent sides.

5 Claims, 6 Drawing Sheets

U.S. PATENT DOCUMENTS

| | | |
|---|---|---|
| 7,091,911 B2 | 8/2006 | Qi et al. |
| 7,160,131 B1 | 1/2007 | Zuo et al. |
| 7,184,370 B2 | 2/2007 | Rogacki et al. |
| 7,193,581 B2 | 3/2007 | Tyler et al. |
| 7,200,009 B2 | 4/2007 | Narhi et al. |
| 7,271,769 B2 | 9/2007 | Asano et al. |
| 7,321,783 B2 | 1/2008 | Kim |
| 7,375,973 B2 | 5/2008 | Nuovo et al. |
| 7,651,813 B2 | 1/2010 | Yokoi et al. |
| 2003/0100275 A1 | 5/2003 | Hsu et al. |
| 2003/0216125 A1 | 11/2003 | Ward et al. |
| 2004/0233645 A1 | 11/2004 | Chen |
| 2004/0259587 A1 | 12/2004 | Chadha |
| 2005/0243506 A1 | 11/2005 | Robertson et al. |
| 2006/0191225 A1 | 8/2006 | Bienick et al. |
| 2006/0198088 A1 | 9/2006 | Anderson et al. |
| 2006/0268528 A1 | 11/2006 | Zadesky et al. |
| 2007/0236870 A1 | 10/2007 | Hachino et al. |
| 2007/0265028 A1 | 11/2007 | Jorgensen |
| 2008/0043413 A1* | 2/2008 | Okuda ............ 361/681 |
| 2008/0163663 A1 | 7/2008 | Hankey et al. |
| 2008/0165485 A1 | 7/2008 | Zadesky et al. |
| 2009/0101239 A1 | 4/2009 | Nakamura et al. |
| 2009/0164035 A1 | 6/2009 | Zadesky et al. |
| 2009/0185344 A1 | 7/2009 | Zadesky et al. |
| 2010/0014224 A1 | 1/2010 | Smirra |
| 2010/0053911 A1 | 3/2010 | Weiss et al. |
| 2010/0055389 A1 | 3/2010 | Allore et al. |
| 2010/0056231 A1 | 3/2010 | Weiss et al. |

FOREIGN PATENT DOCUMENTS

| | | |
|---|---|---|
| JP | 2004-172767 A | 6/2004 |
| JP | 2004188186 A | 7/2004 |
| JP | 2006-228812 A | 8/2006 |
| JP | 2008-167205 A | 7/2008 |
| WO | 9303330 A1 | 2/1993 |
| WO | 9965547 A1 | 12/1999 |
| WO | 2005125158 A1 | 12/2005 |
| WO | 2006018882 A1 | 2/2006 |
| WO | 2007110771 A2 | 10/2007 |

OTHER PUBLICATIONS

Cisco 3200 Series Router Hardware Reference OL-5816-09, Chapter 1, pp. 1-1 to 1-22.

U.S. Appl. No. 10/884,172, filed Jul. 2, 2004 in the name of Zadesky et al., entitled, "Handheld Computing Device".

PCT Search Report & Written Opinion; dated Mar. 19, 2010; Corresponding PCT Application No. PCT/US2009/053326; 11 pages.

Patent Cooperation Treaty, "International Search Report and Written Opinion of the International Searching Authority" for International Application No. PCT/US2009/053325, Mar. 17, 2010, 10 pages.

Patent Cooperation Treaty, "International Search Report and Written Opinion of the International Searching Authority" for International Application No. PCT/US2009/053322, Nov. 16, 2009, 14 pages.

Patent Cooperation Treaty, "International Search Report and Written Opinion of the International Searching Authority" for International Application No. PCT/US2009/053324, Dec. 23, 2009, 12 pages.

United States Patent and Trademark Office, "Non-Final Rejection" for U.S. Appl. No. 12/269,570 dated Jul. 27, 2011, 13 pages.

United States Patent and Trademark Office, "Non-Final Rejection" for U.S. Appl. No. 12/269,589 dated Jun. 27, 2011, 8 pages.

United States Patent and Trademark Office, "Non-Final Rejection" for U.S. Appl. No. 12/269,601 dated Sep. 7, 2011, 24 pages.

* cited by examiner

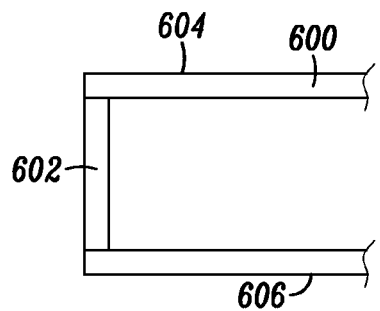 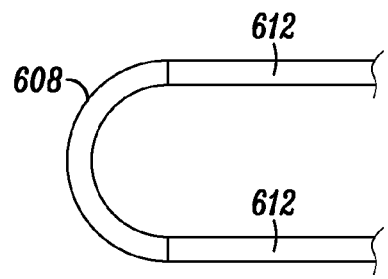
FIG. 6A  FIG. 6B
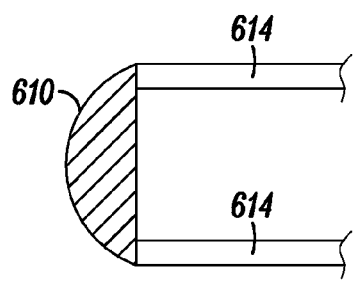 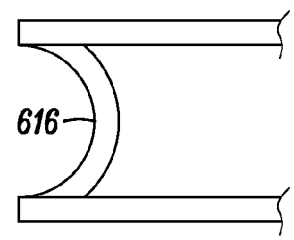
FIG. 6C  FIG. 6D
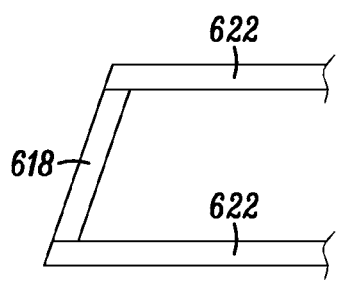 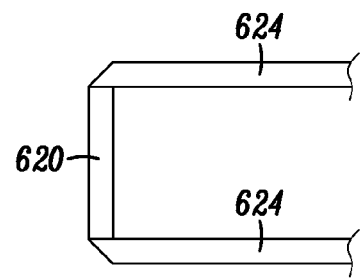
FIG. 6E  FIG. 6F
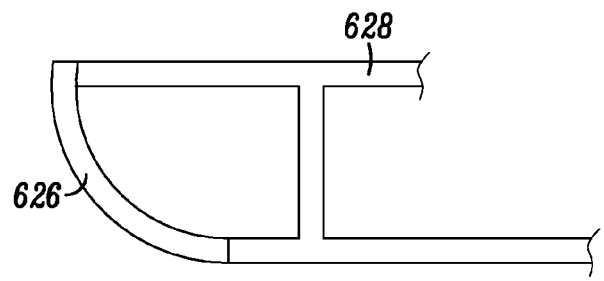
FIG. 6G

EXTRUDED HOUSING FOR HAND-HELD DEVICE WITH A CAP FOR COVERING TWO OR MORE ADJACENT SIDES

CROSS REFERENCE TO RELATED APPLICATIONS

This application claims priority from a U.S. Provisional Patent Application Ser. No. 61/094,052, filed Sep. 3, 2008.

FIELD OF THE INVENTION

The present invention relates generally to a housing for a hand-held electronic device and a method for forming the same, and more particularly, to a housing including an extruded element and a cap for shaping the housing proximate one or more sides of the housing.

BACKGROUND OF THE INVENTION

Hand-held electronic devices have often been made from two separately formed halves of a housing, a front half and a back half, which are coupled together with one or more fasteners, within which the electrical and mechanical components forming the device are placed. Often times, each of the front half and the back half are formed from plastic or other material using an injection molding process, which enables considerable freedom in incorporating diverse sizes and shapes, and which can be used to produce various functional and/or aesthetic effects. Generally, the desired sizes and shapes, and their corresponding arrangement are incorporated into the shape of a mold. The mold is then used to produce the parts.

More recently an increasing amount of housings are being seen, which are being made from materials other than plastics, such as various metals and metal alloys, where the use of metal materials have often been accompanied by still further manufacturing techniques for similarly producing separately formed halves, which are then coupled together. In the case of metals and metal alloys, various techniques including forging, and/or stamping and forming have often been used to produce components used in forming the housings.

The movement toward an increasing amounts of metal in the housings has been precipitated in part due to the decrease in the overall size of devices, while the size of displays, keypads, and other components have alternatively increased in size. This has resulted in less material (i.e. reduced device volume) being used in the formation of the housing, as well as the support structures within and/or forming part of the housing. Correspondingly, the material used to form the housing and/or the corresponding support structures have had to be formed from stronger materials able to withstand an ever increasing load per unit measure. This in turn has facilitated the increasing use of manufacturing processes, which are consistent with the more recently predominant materials being used.

With molded, forged and stamped parts, tooling used in economically producing large volumes of the parts tends to be very specific to a particular design, such that if changes need to be made to the design, often times corresponding changes need to made to the associated tooling. For example, if the parts which are being molded need to be changed, the mold from which the parts are produced would often similarly need to be changed. In some instances, an existing mold might be able to be modified to accommodate a particular change. In other instances, new molds might need to be produced.

Some manufacturing processes for housings for use in hand-held electronic devices have more recently involved the use of extruded materials. Extruded materials typically involve a manufacturing method where an amount of material is pushed or drawn through a die, thereby producing a formed element, which has a generally uniform profile at varying points along the length of the extruded element in the direction of extrusion. More specifically, the formed element generally has a uniform cross sectional shape which is defined by the size and the shape of the openings in the die through which material is pushed or drawn. In addition to using the die to define the outer cross sectional shape, hollow sections within the shape can similarly be formed, for example, by placing a pin or piercing mandrel inside the die. Traditionally, extrusions have been used in applications where an element having long, straight and generally uniform shapes are desired. For elements having significant variations along the length of the element, extrusions have typically been avoided.

Recent extruded elements used in the formation of a housing have included an extrusion having one piece continuous outer profile, which is used to form both the front, back and sides of the device. Such a construction can result in enhanced structural strength, in so far as the front, back and sides are formed as part of a one piece construction. A hollow section is formed in the extruded element having an opening at the beginning and end of the extrusion, often corresponding to a top and bottom, within which mechanical and electronic components can be placed. In some instances openings will be cut into the sidewall of the extruded element along the length of the same to provide more direct access to some of the internally placed and appropriately aligned mechanical and electronic components. After the components have been placed within the housing, the openings at the ends of the extrusion are generally capped.

In such an instance, the appearance of the housing is generally very uniform (i.e. generally does not vary) along the length of the extrusion. To date, such a construction has resulted in housings which have very limited amounts of variability along the length of the extrusion. While such a style can be very clean and uniform, sometimes such a style can be very plain. In some instances, it can be very difficult to deviate from such a style even when function and/or aesthetics would prefer such a deviation, which limits the type of housings that have historically been produced through such a manufacturing process.

The present inventors have recognized that it would be beneficial if further shaping of the extruded element could be implemented to enable more variability in the appearance of the housing, which incorporates an extruded element. While traditionally caps have been used to primarily provide a cover for the openings at the ends of the extruded element, the present inventors have recognized that it would be further beneficial if caps or extrusion covers could be used to help shape the overall device. Furthermore, the cap could extend to cover substantial portions of two or more adjacent sides, which would provide for more comprehensive shaping including shaping which extends to include one or more of the corners of the device. Still further, the cap could incorporate a mechanism that enables selective access to the interior of the device, as well as help to accommodate an extruded element which has a front surface and a back surface that are non-symmetrical.

SUMMARY OF THE INVENTION

The present invention provides a housing for a hand-held electronic device. The housing includes an extruded element having a length and a profile, the length corresponding to a distance that the extruded element extends in the direction of extrusion, and the profile corresponding to a cross-section of the element, which is perpendicular to the direction of extrusion. The housing further includes a cap, coupled to the extruded element, wherein the cap extends to cover substantial portions of two or more adjacent sides.

In at least one embodiment, the cap includes one or more access openings for accessing a space behind the cap.

In at least a further embodiment, the profile of the extruded element has a major axis which extends a distance in a first direction and a minor axis which extends a distance in a second direction which is substantially perpendicular to the first direction, and wherein the amount of the distance that the profile extends in the direction of the major axis is greater than the amount of the distance that the profile extends in the direction of the minor axis. A front surface and a back surface of the hand-held electronic device are defined by the major axis of the profile of the extruded element and the length of the extruded element in the direction of extrusion proximate respective ends of the profile along the minor axis.

In some instances, the front surface and the back surface are non-symmetrical, where the non-symmetry could be formed by machining one side of the profile at at least one of a beginning and an end of the extruded element, or could be formed by cutting the extruded element during extrusion at an angle that is not perpendicular to the direction of extrusion, thereby forming one of a beginning or an end of the extruded element.

The present invention further provides a hand-held electronic device including a housing. The housing of the hand-held electronic device includes an extruded element having a length and a profile, the length corresponding to a distance that the extruded element extends in the direction of extrusion, and the profile corresponding to a cross-section of the element, which is perpendicular to the direction of extrusion. The housing further includes a cap, coupled to the extruded element, wherein the cap extends to cover substantial portions of two or more adjacent sides.

BRIEF DESCRIPTION OF THE DRAWINGS

FIGS. 6(a)-6(g) are partial cutaway side plan views of multiple exemplary extruded elements with corresponding extrusion covers;

DETAILED DESCRIPTION OF THE PREFERRED EMBODIMENT(S)

Figure 1:
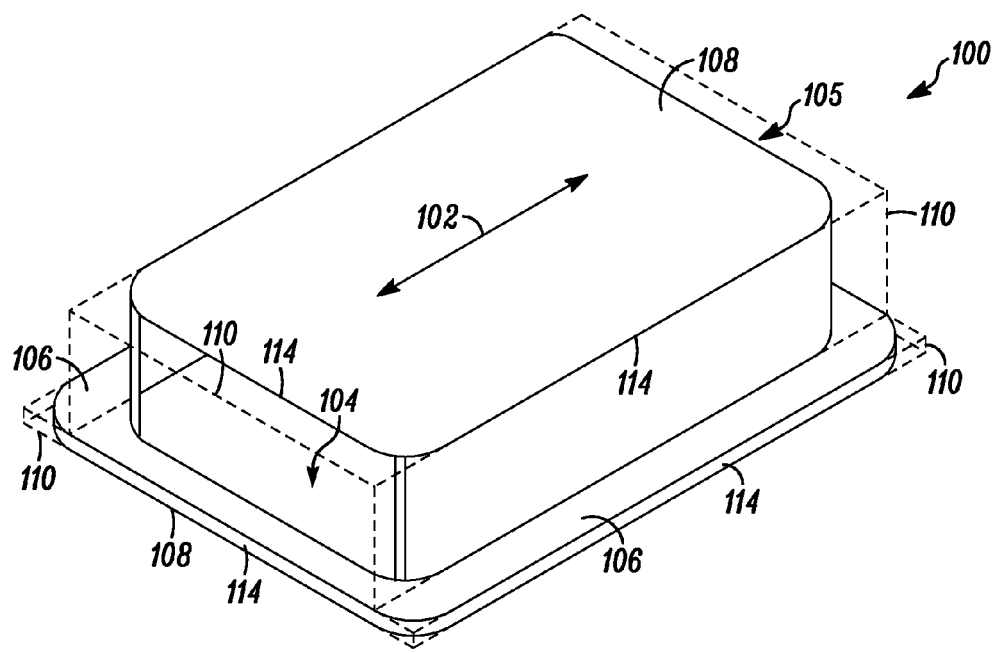
FIG. 1 is a perspective view of an exemplary extruded element for use as a housing for a hand-held electronic device, which has been machined to remove some of the extruded material.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a perspective view of an exemplary extruded element 100 for use as a housing for a hand-held electronic device, which has been machined to remove some of the extruded material. Examples of different types of hand-held electronic devices for which the housing might be suitable include radio frequency (i.e. cellular) telephones, media (i.e. music) players, personal digital assistants, portable video gaming devices, cameras, and/or remote controls. However, one skilled in the art will readily recognize that the housings could be used for other types of hand-held devices without departing from the teachings of the present invention.

In connection with the illustrated embodiment, an arrow 102 defines a direction of extrusion of the extruded element 100. An extruded element generally has a profile, which is perpendicular to the direction of extrusion, that is largely uniform and defined by the size and shape of an opening in a die through which the extruded material is pushed and/or drawn. In the illustrated embodiment, the profile corresponds to a cross-section of the extruded element 100 that is perpendicular to the direction of extrusion, which is substantially aligned with the surface having a rectangular opening 104. The rectangular opening 104 defines one end of an interior space, that runs the length of the extruded element 100. Another opening 105 defines a second end of the interior space at the other end of the extruded element (see also FIG. 4 and FIG. 11).

In the illustrated embodiment, the profile has a substantially continuous outer boundary, which along the length of the extruded element 100 forms a tubular structure, which encapsulates an internal space formed by the rectangular opening as it extends the length of the extruded element 100. The profile further includes one or more arms 106, which extend from respective points along the substantially continuous outer boundary in a direction substantially perpendicular to the direction of extrusion. More specifically in the particular embodiment illustrated, a pair of arms 106 extend from the substantially continuous outer boundary at a point corresponding to one of the front or back surfaces 108 of the extruded element 100, each extending in generally opposite directions. This produces a ridge at one of the front or back surfaces of the extruded element, which extends from respective sides of the extruded element 100 along the length of the extruded element.

In the particular embodiment illustrated in FIG. 1, a portion of the extruded element subsequent to extrusion has been machined away. The resulting structure after machining corresponds to the structure illustrated using solid lines. The structure of the extruded element prior to machining additionally incorporates structure embodied by dashed lines 110. After machining the corners in the areas at each end of the arms 106 have been rounded, as well as a portion of the continuous outer boundary at each of the beginning and the end of the extrusion has been removed. As a result, the extruded element 100 begins to deviate from the normally very uniform appearance and the more traditionally straight lines commonly associated with an extruded element in the direction of extrusion. In the context of the present invention, machining refers to a subsequently applied process that facilitates the further shaping of the extruded element through the removal of selective portions of the extruded element. In at least some embodiments, the machining might take the form of cutting, drilling, grinding, stamping, punching and/or etching away of portions of the extruded element. One skilled in the art will appreciate that the above listed types of machining processes represents an exemplary list of various forms of machining, and that still further forms of machining can be used in conjunction with the extruded element without departing from the teachings of the present invention.

Figure 2:
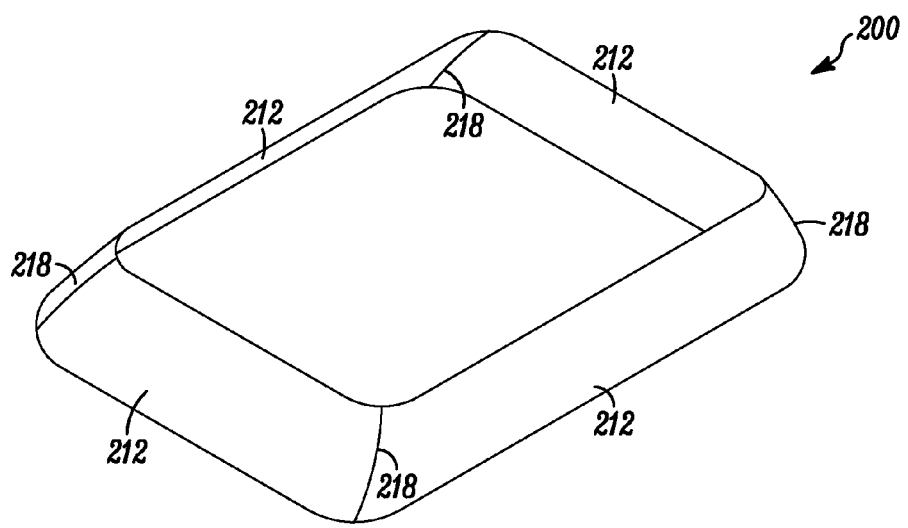
FIG. 2 is a perspective view of a cap or extrusion cover, which is adapted to cover substantial portions of two or more adjacent sides, in accordance with at least one embodiment of the present invention for use with the extruded element, illustrated in FIG. 1.

FIG. 2 illustrates a perspective view of a cap or extrusion cover 200, which is adapted to cover substantial portions of two or more adjacent sides, in accordance with at least one embodiment of the present invention for use with the extruded element 100, illustrated in FIG. 1. More specifically in the particular embodiment illustrated, the extrusion cover 200 includes a four sided structure, which is intended to wrap around at least a portion of the structure of the extruded element, where the side walls 212 of the extrusion cover 200 extend between the outer edges 114 of the extruded element at each of the front and back surfaces 108 of the extruded element 100.

By using an extrusion cover 200 that is adapted to cover substantial portions of two or more adjacent sides, the corner 218 shared by any two adjacent sides can be shaped so as to deviate from the type of corner one might expect from previous types of extruded housings. In the embodiment illustrated in FIG. 2, a four sided extrusion cover 200 enables all four corners 218 to be correspondingly shaped. Covering a substantial portion of two or more adjacent sides includes extending away from the shared corner a distance sufficient that the corner can be meaningfully defined. In instances where the extrusion cover in intended to cover an opening in the profile of the extruded element, the extrusion cover extends along the other one of the adjacent sides beyond the plane of the surface that includes the opening to the interior space in the profile of the extruded element.

Figure 3:
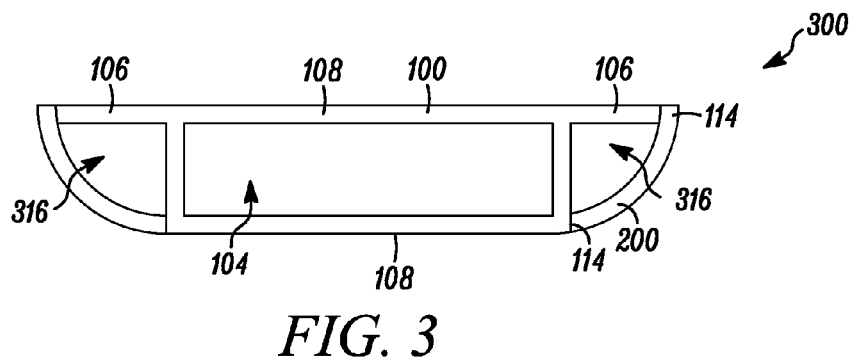
FIG. 3 is a bottom or top plan sectional side view of the exemplary extruded element, illustrated in FIG. 1, coupled to the extrusion cover, illustrated in FIG. 2.

FIG. 3 illustrates a bottom or top plan sectional side view 300 of the exemplary extruded element 100, illustrated in FIG. 1, coupled to the extrusion cover 200, illustrated in FIG. 2. While the extruded element 100 might be formed from a metal or a metal alloy, in at least some embodiments the extrusion cover 200 will be formed from a radio frequency transparent molded material, such as plastic or ceramic. Correspondingly, the space 316 between the extruded element 100 and the extrusion cover 200 could house elements that might transmit or receive electromagnetic energy. The radio frequency transparency of the material used to form the extrusion cover would enable radio frequency electromagnetic energy originating from a space outside of the device to enter the space 316 between the extruded element 100 and the extrusion cover 200, and radio frequency electromagnetic energy originating from inside the space 316 between the extruded element 100 and the extrusion cover 200 to escape toward the space outside of the device for supporting wireless communication.

Figure 4:
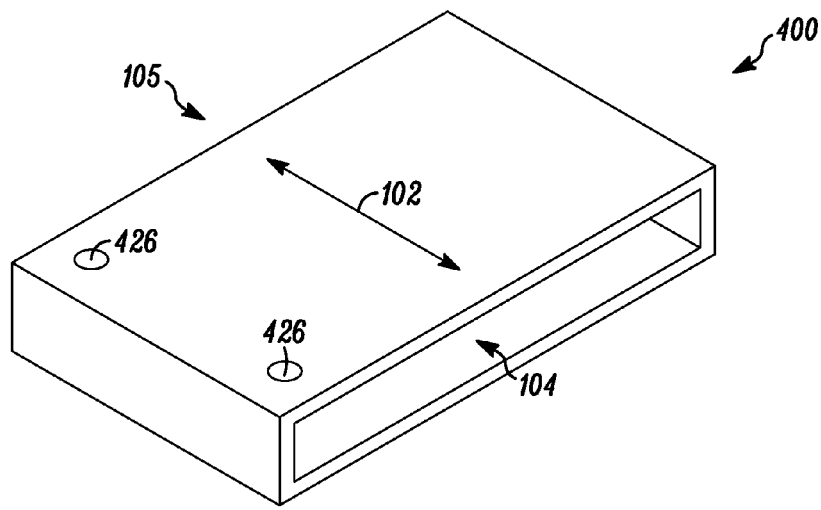
FIG. 4 is a perspective view of an exemplary extruded element for use as a housing for a hand-held electronic device, adapted for receiving an extrusion cover in accordance with a further aspect of the present invention.
Figure 5:
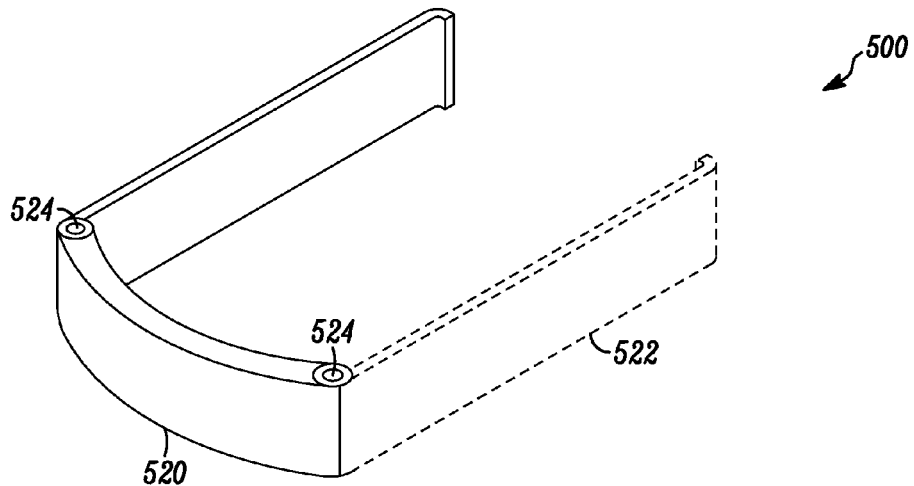
FIG. 5 is a perspective view of an exemplary extrusion cover for use with the extruded element illustrated in FIG. 4.

FIG. 4 illustrates a perspective view of an exemplary extruded element 400 for use as a housing for a hand-held electronic device, adapted for receiving an extrusion cover in accordance with a further aspect of the present invention. FIG. 5 illustrates a perspective view of an exemplary extrusion cover 500 for use with the extruded element 400 illustrated in FIG. 4. The solid line construction 520 illustrated in FIG. 5 illustrates an exemplary two sided extrusion cover, while additional dotted line construction 522 illustrates how the two sided extrusion cover 500 could be extended to encompass a third side.

Corresponding holes 524 molded into the extrusion cover 500 and holes 426 machined into the extruded element 400 could be used to attach the extrusion cover 500 to the extruded element 400. The machined holes 426 could be tapped so as to more readily receive a threaded type fastener, such as a screw, which could be used to facilitate the attachment. However, one skilled in the art will readily recognize that the attachment or the specific form of attachment is not a necessary element of the present invention, and that one could use other forms of attachment without deviating from the teachings of the present invention.

In addition to shaping the corners, an extrusion cover can similarly be used to provide greater flexibility in providing a shape to the associated sides, including the sides of the extrusion corresponding to the opening in the profile used to form the internal space. FIG. 6(*a*)-6(*g*) illustrate partial cutaway side plan views of multiple exemplary extruded elements with corresponding extrusion covers, which produce various different side features. FIG. 6(*a*) provides an extrusion cover 602 that laterally extends in a relatively straight line fashion from one side 604, such as a front side, of an extruded element 600 to the other side 606, such as a back side, of the extruded element 600. FIGS. 6(*b*) and 6(*c*) illustrate extrusion covers 608, 610 that alternatively provides a convex shaped surface from the perspective of a user external to the device. The convex shaped surface similarly extends between the respective sides of extruded elements 612, 614. Alternatively, FIG. 6(*d*) illustrate an extrusion cover 616 having a concave shaped surface which faces the user from a position external to the device.

Similar to FIG. 6(*a*), FIGS. 6(*e*) and 6(*f*) illustrate extrusion covers 618, 620 that laterally extends from one side of the respective extruded elements 622, 624 to the other side of the respective extruded elements 622, 624. In the embodiment illustrated in FIG. 6(*e*), the extrusion cover 618 extends between the sides of an extruded element having non-symmetrical front and back surfaces, where one of the two sides of the extruded element is either offset or extends out further relative to the other one of the two sides, such that the extrusion cover extends between the ends of the two sides at an angle other than a perpendicular angle, relative to the predominate surfaces formed by the extrusion cover and each of the two sides. In the embodiment illustrated in FIG. 6(f), the sidewalls have a chamfer at the edge of the sidewall proximate the extrusion cover to produce a little more rounded appearance along the resulting side surface formed predominately by the extrusion cover 620.

Lastly, FIG. 6(g) illustrates a rounded extrusion cover 626 that extends from one side of a non-symmetrical extruded element 628 to the other side of the non-symmetrical extruded element. While, the presence of the internal wall suggests that the extrusion cover is being applied to the extruded element 628 along a side of the extruded element that is substantially parallel to the direction of extrusion, one skilled in the art will recognize that a similar profile extrusion cover can be alternatively applied to a side of the extruded element that is substantially perpendicular to the direction of extrusion.

Figure 7:
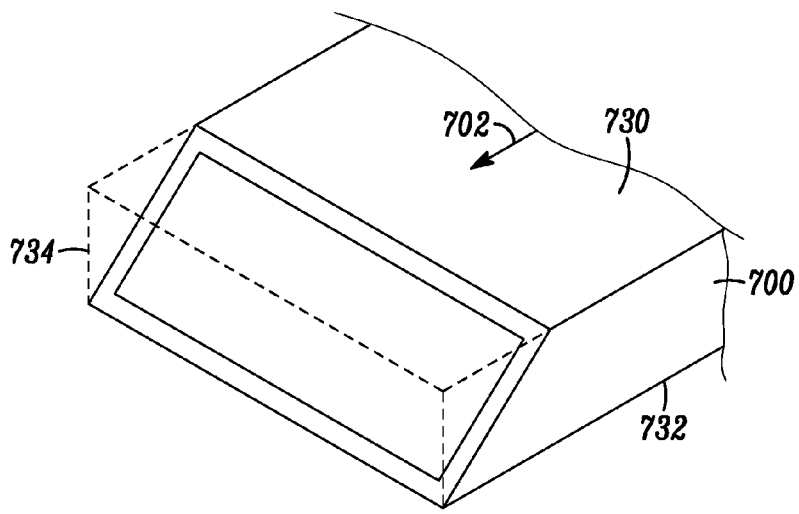
FIG. 7 is a partial perspective view of an exemplary extruded element for use as a housing for a hand-held electronic device, which has a non-symmetrical front and back surfaces.

As illustrated in the exemplary embodiments illustrated in FIGS. 1-3 and FIGS. 6(e) and 6(g), the use of an extruded element having a front surface and a back surface that are non-symmetrical can sometimes provide even greater opportunities for producing overall shaping which varies from the more traditional straight lines and limited amounts of variability along the length of the extrusion commonly associated with housings made with extruded elements. FIG. 7 illustrates a partial perspective view of an exemplary extruded element 700 for use as a housing for a hand-held electronic device, which has a non-symmetrical front surface 730 and back surface 732, where the back surface extends further than the front surface at one end of the extruded element in the direction of extrusion. Dashed lines 734 represents an outline of an extruded element, which follows a more traditional symmetrical extrusion where the extruded element is cut along a plane that is substantially perpendicular to the direction 702 of extrusion.

Figure 8:
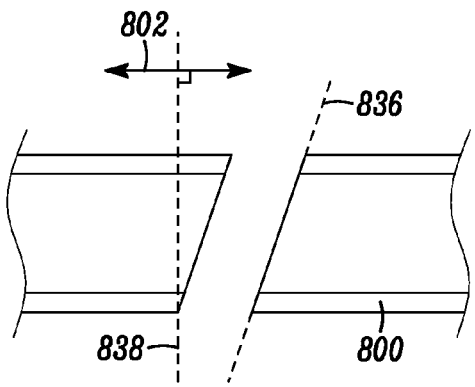
FIG. 8 is a partial cutaway side plan view illustrating one exemplary manner of producing an extruded element with non-symmetrical front and back surfaces.
Figure 9:
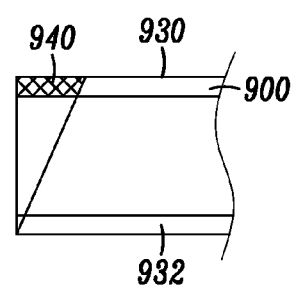
FIG. 9 is a partial cutaway side plan view illustrating a further exemplary manner of producing an extruded element with non-symmetrical front and back surfaces.

FIG. 8 illustrates a partial cutaway side plan view illustrating one exemplary manner of producing an extruded element 800 with non-symmetrical front and back surfaces. More specifically, the particular manner illustrated includes cutting 836 the extrusion at an angle that deviates from the more traditional cut 838 which follows along a plane that is substantially perpendicular to the direction of extrusion 802, both being represented by respective dashed lines in the figure. FIG. 9 illustrates a partial cutaway side plan view illustrating a further exemplary manner of producing an extruded element 900 with non-symmetrical front 930 and back 932 surfaces, where after initially cutting the extruded element along the more traditional perpendicular plane, a portion 940 of the extruded element 900 is machined away from the already extruded element 900.

Figure 10:
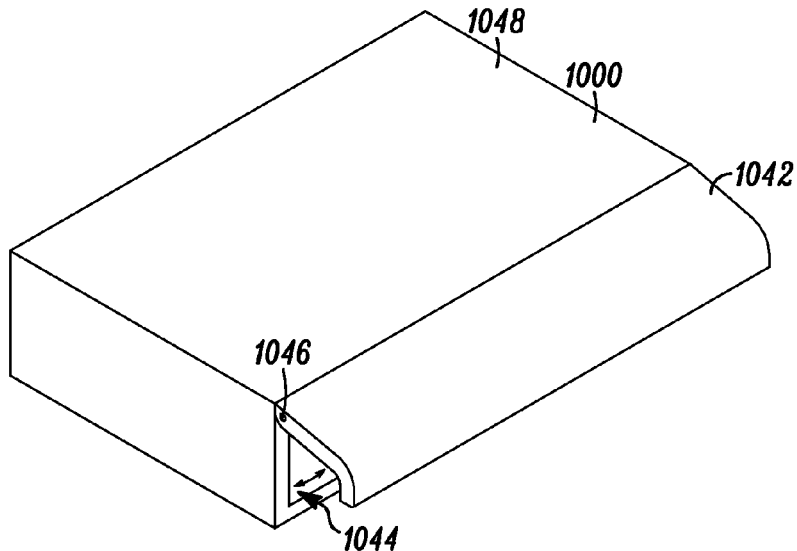
FIG. 10 is a perspective view of an exemplary extruded element and an extrusion cover including a door for accessing a space internal to the extruded element located behind the extrusion cover.

While the extrusion cover can be used to provide a more varied contour to one or more of the side surfaces, as well as can be used to close one or more of the openings leading to an internal space formed as part of the extrusion process. In some instances, it may be desirable to provide selective access to the internal space through an extrusion cover. FIG. 10 illustrates a perspective view of an exemplary extruded element 1000 and an extrusion cover including a door 1042 for accessing a space 1044 internal to the extruded element 1000 located behind the extrusion cover.

Figure 11:
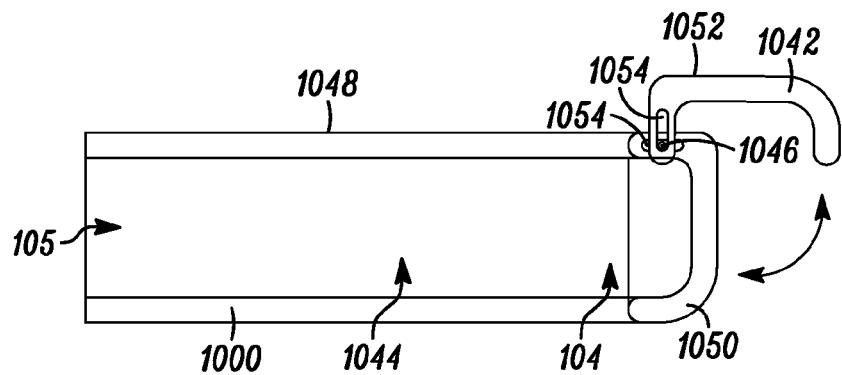
FIG. 11 is a top or bottom cutaway plan view of the exemplary extruded element and the extrusion cover including a door for accessing a space internal to the extruded element located behind the extrusion cover, illustrated in FIG. 10.

In the illustrated embodiment, the door 1042 rotates about a pivot point 1046 located at edge of the extruded element 1000 proximate one of the front or back surfaces 1048 of the extruded element 1000. FIG. 11 illustrates a top or bottom cutaway plan view of the exemplary extruded element 1000 and the extrusion cover including a door 1042 for accessing a space 1044 internal to the extruded element 1000 located behind the extrusion cover, illustrated in FIG. 10. The door 1042 is shown in two positions. A first position 1050 represents the door in a closed position, and a second position 1052 represents the door in at least a partially opened position. In order to facilitate the rotation of the door 1042, in some instances proximate the pivot 1046, the door might include a slot 1054 within which the pivot point 1046 can slide. Such a sliding in some circumstances might provide additional clearance between the door 1042 and the extruded element 1000 for enabling a smoother rotation. Conversely, once the door has moved from at least a partially opened 1052 position to a closed position 1050, the door might move such that the pivot point 1046 repositions itself relative to the slot 1054, in a manner that might secure a more snug fit against the extruded element 1000 while in the closed position.

Figure 12:
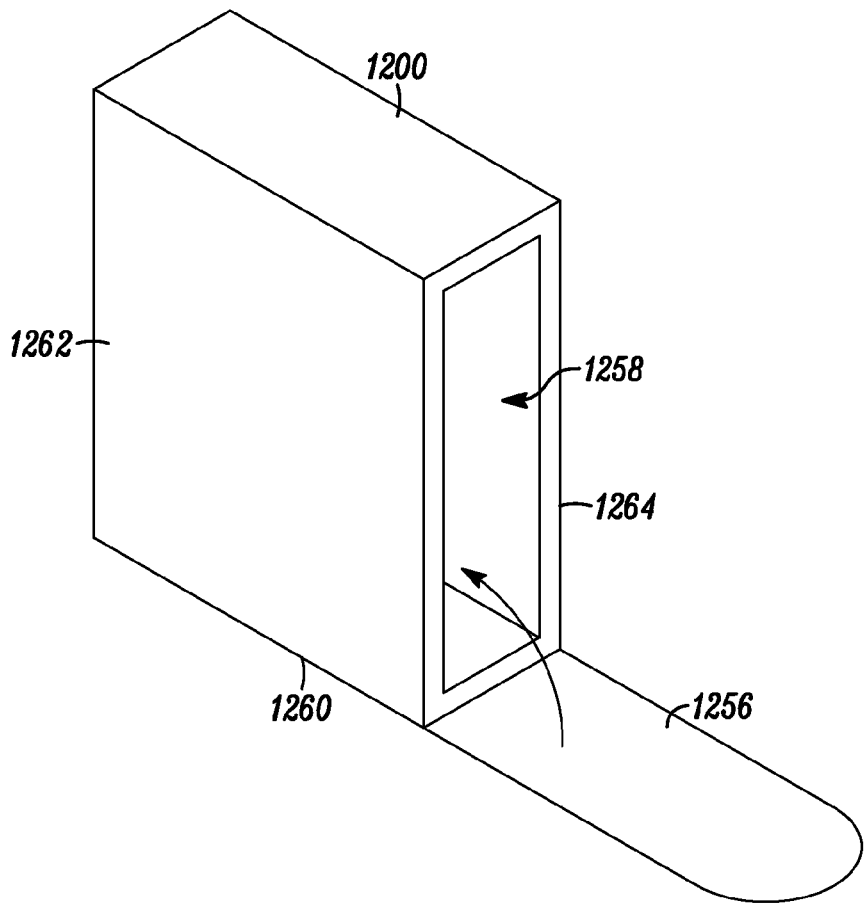
FIG. 12 is a perspective view of an exemplary extruded element and an extrusion cover including a door for accessing a space internal to the extruded element located behind the extrusion cover, in accordance with a further embodiment.

FIG. 12 illustrates a perspective view of an exemplary extruded element 1200 and an extrusion cover including a door 1256 for accessing a space 1258 internal to the extruded element located behind the extrusion cover, in accordance with a further embodiment. In the further embodiment illustrated in FIG. 12, the door 1256 pivots relative to the extruded element 1200 at an edge of the extruded element proximate one of the side surfaces 1260 of the extruded element, as opposed to one of the front 1262 or back 1264 surfaces.

Figure 13:
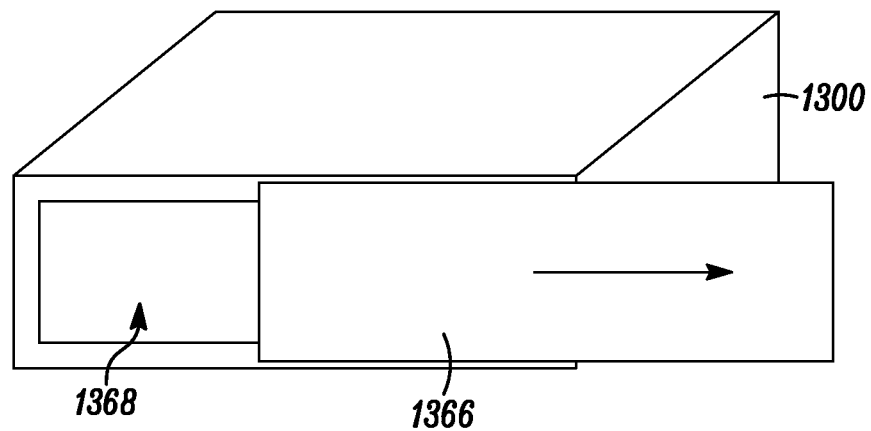
FIG. 13 is a perspective view of an exemplary extruded element and an extrusion cover including a door for accessing a space internal to the extruded element located behind the extrusion cover; in accordance with a still further embodiment.

FIG. 13 illustrates a perspective view of an exemplary extruded element 1300 and an extrusion cover including a door 1366 for accessing a space 1368 internal to the extruded element 1300, in accordance with a still further embodiment. While in the previously discussed exemplary embodiments the door rotated about a pivot point, in the embodiment illustrated in FIG. 13, the door 1366 slides laterally relative to the extruded element 1300 in order to facilitate a repositioning between a closed position and at least a partially opened position.

Figure 14:
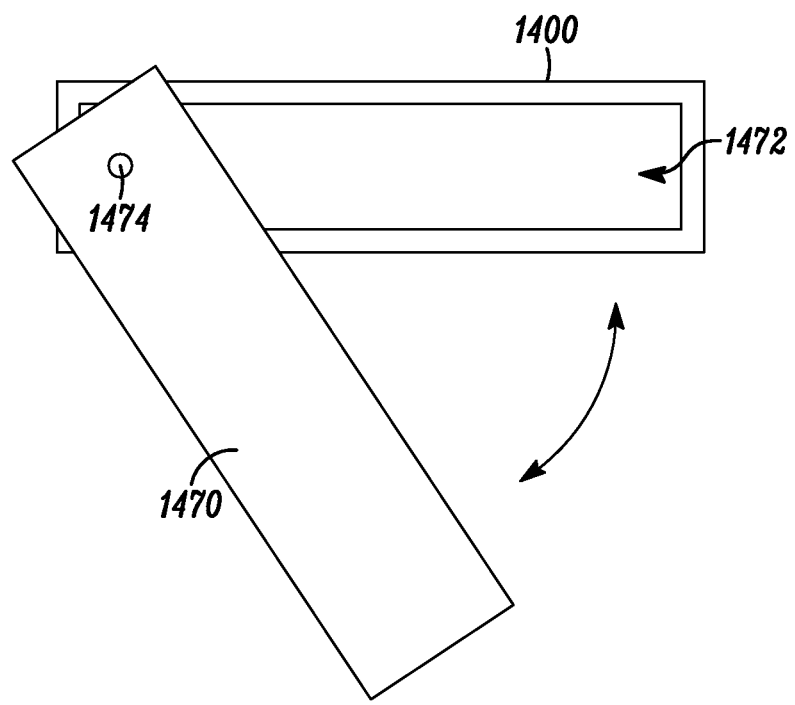
FIG. 14 is a perspective view of an exemplary extruded element and an extrusion cover including a door for accessing a space internal to the extruded element located behind the extrusion cover; in accordance with yet a still further embodiment.

FIG. 14 illustrates a perspective view of yet a still further exemplary extruded element 1400 with an extrusion cover which includes a door 1470 for accessing a space 1472 internal to the extruded element 1400, where a still further form of pivoting is illustrated. In the present embodiment, the door 1470 generally pivots so as to generally stay within the same plane while moving between a closed position and at least a partially opened position about a pivot point 1474, while similarly remaining substantially in the same plane as the opening to which the door is intended to allow selective access.

While several styles of doors have been disclosed that might be incorporated into an extrusion cover for providing selective access to the interior space of the extruded element, one skilled in the art will readily recognize that still further styles of doors could be used which potentially incorporate still further opening mechanics without departing from the teachings of the present invention.

One skilled in the art will recognize that the extrusion covers, and corresponding extruded elements can take many different forms, without departing from the teachings of the present invention. While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A housing for a hand-held electronic device comprising:
   an extruded element having a length and a profile, the length corresponding to a distance that the extruded element extends in a direction of extrusion, and the profile corresponding to a cross-section of the element, which is perpendicular to the direction of extrusion; and
   a cap, coupled to the extruded element, wherein the cap extends to substantially cover two or more adjacent sides of the extruded element;
   wherein the sides of the extruded element includes a front side, a back side, a left side and a right side, each defining an outer boundary of the extruded element and extending along a direction consistent with the direction of extrusion; where the back side is laterally offset from the front side, and the left side and the right side extend between the front side and the back side, the left side being laterally offset from the right side;
   wherein the sides of the extruded element additionally includes a top side and a bottom side, where the bottom side is laterally offset from the top side, and where each of the top side and the bottom side extends between each of the front side and the back side, and the left side and the right side, the top side corresponding to a beginning of the extruded element and the bottom side corresponding to an end of the extruded element;
   wherein the profile has a substantially continuous outer boundary, corresponding to an outer perimeter of the profile, which extends the length of the extruded element, defining a substantially tubular member having an internal space, which extends the length of the extruded element in the direction of the extrusion and has an opening at each of the beginning and the end of the extruded element; and
   wherein at least one of the two or more adjacent sides for which substantial portions are covered by the cap includes one of the opening at the beginning of the extruded element or the opening at the end of the extruded element.

2. A housing for a hand-held electronic device in accordance with claim 1, wherein the two or more adjacent sides of the cap includes three adjacent sides, where two of the three adjacent sides, respectively, substantially cover the opening at each of the beginning and the end of the extruded element.

3. A housing for a hand-held electronic device comprising:
   an extruded element having a length and a profile, the length corresponding to a distance that the extruded element extends in a direction of extrusion, and the profile corresponding to a cross-section of the element, which is perpendicular to the direction of extrusion; and
   a cap, coupled to the extruded element, wherein the cap extends to cover substantial portions of two or more adjacent sides;
   wherein the profile has a substantially continuous outer boundary, corresponding to an outer perimeter of the profile, which extends the length of the extruded element, defining a substantially tubular member having an internal space, which extends the length of the extruded element in the direction of the extrusion and has an opening at each of a beginning and an end of the extruded element;
   wherein at least one of the two or more adjacent sides for which substantial portions are covered by the cap includes one of the opening at the beginning of the extruded element or the opening at the end of the extruded element; and
   wherein the profile includes one or more arms, which extend from respective points along the substantially continuous outer boundary in a direction substantially perpendicular to the direction of extrusion.

4. A housing for a hand-held electronic device in accordance with claim 3, wherein along at least one of the two or more adjacent sides the cap extends from an end of the arm that is distal from the substantially continuous outer boundary to a point along the substantially continuous outer boundary a distance away from the respective point that the arm extends from the substantially continuous outer boundary.

5. A housing for a hand-held electronic device in accordance with claim 4, wherein space between the cap and the outer boundary define a pocket.

* * * * *